United States Patent
Ahn et al.

(10) Patent No.: US 9,852,700 B2
(45) Date of Patent: Dec. 26, 2017

(54) LIQUID CRYSTAL DISPLAY AND METHOD FOR DRIVING THE SAME

(71) Applicant: LG ELECTRONICS INC., Seoul (KR)

(72) Inventors: Seongyeol Ahn, Pyeongtaek-si (KR); Kangsoo Kim, Pyeongtaek-si (KR)

(73) Assignee: LG ELECTRONICS INC., Seoul (KR)

( * ) Notice: Subject to any disclaimer, the term of this patent is extended or adjusted under 35 U.S.C. 154(b) by 17 days.

(21) Appl. No.: 14/912,870

(22) PCT Filed: Dec. 20, 2013

(86) PCT No.: PCT/KR2013/011921
§ 371 (c)(1),
(2) Date: Feb. 18, 2016

(87) PCT Pub. No.: WO2015/034139
PCT Pub. Date: Mar. 12, 2015

(65) Prior Publication Data
US 2016/0203774 A1 Jul. 14, 2016

(30) Foreign Application Priority Data
Sep. 3, 2013 (KR) .................. 10-2013-0105204

(51) Int. Cl.
*G09G 3/34* (2006.01)
*G02F 1/1335* (2006.01)
*G09G 3/36* (2006.01)

(52) U.S. Cl.
CPC ......... *G09G 3/3426* (2013.01); *G02F 1/1336* (2013.01); *G02F 2001/133601* (2013.01);
(Continued)

(58) Field of Classification Search
CPC ......... G09G 2320/0646; G09G 3/3426; G09G 3/3648; G09G 2360/16; G09G 2330/021;
(Continued)

(56) References Cited

U.S. PATENT DOCUMENTS 8,576,159 B2 * 11/2013 Cho ..................... G09G 3/3426
345/690
8,654,052 B2 * 2/2014 Lee ..................... G09G 3/3426
345/690
(Continued)

FOREIGN PATENT DOCUMENTS

KR 10-2008-0061203 A 7/2008
KR 10-2009-0081290 A 7/2009
KR 10-1038775 B1 6/2011

OTHER PUBLICATIONS

International Search Report dated May 27, 2014 issued in Application No. PCT/KR2013/011921 (English translation only).

*Primary Examiner* — Dismery Mercedes
(74) *Attorney, Agent, or Firm* — Ked & Associates, LLP (57) ABSTRACT

A liquid crystal display and a method for driving the same are disclosed. The liquid crystal display includes a display panel which is virtually divided into a plurality of blocks, a backlight unit including a plurality of light sources irradiating light onto the display panel, a backlight dimming controller which analyzes digital video data, calculates a dimming value of each of the blocks, and adjusts a global dimming value based on the dimming values of the blocks so as to increase brightness of the plurality of light sources within previously determined power consumption, and a light source driver which outputs light source driving signals for driving the plurality of light sources based on the dimming values of the blocks and the global dimming value.

7 Claims, 10 Drawing Sheets

(52) U.S. Cl.
CPC ... *G09G 3/3648* (2013.01); *G09G 2320/0646* (2013.01); *G09G 2320/0686* (2013.01); *G09G 2360/16* (2013.01)

(58) Field of Classification Search
CPC ....... G02F 2001/133601; G02F 1/1336; G06T 2207/20021; G06T 5/009
See application file for complete search history.

(56) References Cited

U.S. PATENT DOCUMENTS

| | | | | |
|---|---|---|---|---|
| 8,665,298 B2* | 3/2014 | Hong | ................... | G09G 3/3426 345/102 |
| 8,760,385 B2* | 6/2014 | Kwon | ................... | G09G 3/3426 345/102 |
| 8,890,794 B2* | 11/2014 | Kim | ..................... | G09G 3/3406 345/102 |
| 9,087,485 B2* | 7/2015 | Ahn | ..................... | G09G 3/3426 |
| 9,189,998 B2* | 11/2015 | An | .................... | G09G 3/3426 |
| 9,230,485 B2* | 1/2016 | Byun | ................... | G09G 3/3406 |
| 9,489,725 B2* | 11/2016 | Kwon | .................... | G06T 5/008 |
| 9,620,052 B2* | 4/2017 | Choi | ........................ | G09G 3/22 |
| 2009/0184917 A1* | 7/2009 | Park | ...................... | G09G 3/3426 345/102 |
| 2010/0085374 A1* | 4/2010 | Lee | ...................... | G09G 3/3426 345/102 |
| 2011/0122168 A1* | 5/2011 | Lee | ...................... | G09G 3/3426 345/690 |
| 2011/0137248 A1 | 6/2011 | Winter | | |
| 2011/0141077 A1* | 6/2011 | Cho | ...................... | G09G 3/3426 345/207 |
| 2011/0141155 A1* | 6/2011 | Hong | ................... | G09G 3/3426 345/690 |
| 2011/0141166 A1* | 6/2011 | Ahn | ...................... | G09G 3/3426 345/691 |
| 2011/0175949 A1* | 7/2011 | Wallener | ................ | G09G 3/342 345/690 |
| 2011/0249033 A1* | 10/2011 | Oh | ....................... | G09G 3/3426 345/690 |
| 2012/0013601 A1* | 1/2012 | Park | ................... | G02B 27/2264 345/419 |
| 2012/0086713 A1 | 4/2012 | Cho et al. | | |
| 2014/0063078 A1* | 3/2014 | Choi | ....................... | G09G 3/22 345/690 |

* cited by examiner

| BL1 (0.5) | BL2 (0.5) | BL3 (0.6) | BL4 (0.7) |
|---|---|---|---|
| BL5 (0.6) | BL6 (0.8) | BL7 (0.7) | BL8 (0.7) |
| BL9 (0.5) | BL10 (1.0) | BL11 (0.8) | BL12 (0.6) |
| BL13 (0.3) | BL14 (0.3) | BL15 (0.4) | BL16 (0.6) |

[Figure 6c]

| BL1<br>(0.83) | BL2<br>(0.83) | BL3<br>(1.00) | BL4<br>(1.17) |
|---|---|---|---|
| BL5<br>(1.00) | BL6<br>(1.34) | BL7<br>(1.17) | BL8<br>(1.17) |
| BL9<br>(0.83) | BL10<br>(1.67) | BL11<br>(1.34) | BL12<br>(1.00) |
| BL13<br>(0.50) | BL14<br>(0.50) | BL15<br>(0.67) | BL16<br>(1.00) |

LIQUID CRYSTAL DISPLAY AND METHOD FOR DRIVING THE SAME

CROSS-REFERENCE TO RELATED PATENT APPLICATIONS

This application is a U.S. National Stage Application under 35 U.S.C. §371 of PCT Application No. PCT/KR2013/011921, filed Dec. 20, 2013, which claims priority to Korean Patent Application No. 10-2013-0105204, filed Sep. 3, 2013, whose entire disclosures are hereby incorporated by reference.

TECHNICAL FIELD

Embodiments of the invention relate to a liquid crystal display and a method for driving the same.

BACKGROUND ART

An active matrix liquid crystal display displays a motion picture using a thin film transistor (TFT) as a switching element. The liquid crystal display may be made to be smaller and more compact than a cathode ray tube (CRT) and thus may be applied to display units of portable information appliances, office equipments, computers, etc. Further, the liquid crystal display may be applied to televisions and thus is rapidly replacing the cathode ray tube.

A transmission type liquid crystal display occupying most of the liquid crystal displays controls an electric field applied to a liquid crystal layer and modulates light coming from a backlight unit, thereby displaying an image. The image quality of the liquid crystal display depends on contrast characteristics. It is limited to an improvement of the contrast characteristics using only a method for controlling a data voltage applied to the liquid crystal layer to modulate a light transmittance of the liquid crystal layer. Accordingly, a backlight dimming method for controlling brightness of light sources of the backlight unit based on an input image was proposed so as to further improve the contrast characteristics.

Examples of the backlight dimming method include a global dimming method for controlling a luminance of an entire display surface and a local dimming method for locally controlling the luminance of the display surface. The global dimming method may improve a dynamic contrast measured between two successively arranged frames. The local dimming method locally controls the luminance of the display surface during one frame, thereby improving a static contrast which has difficulty in being improved through the global dimming method.

The related art local dimming method divides input digital video data in conformity with virtual blocks divided from a display screen of a liquid crystal display panel in a matrix form, obtains a representative value of the input digital video data of each block, and adjusts a dimming value of each block based on the representative value of each block, thereby controlling the brightness of the light sources belonging to each block in the backlight unit. The related art local dimming method increases a driving current supplied to the light sources and/or a length of a supply period of the driving current, thereby increasing the brightness of the light sources. However, when the driving current and/or the length of the supply period of the driving current increase without limit so as to increase the brightness of the light sources, an increase in power consumption is caused.

DISCLOSURE

Technical Problem

Embodiments of the invention provide a liquid crystal display and a method for driving the same capable of performing local dimming and at the same time increasing a luminance of a display panel within previously determined power consumption.

Technical Solution

In one aspect, there is a liquid crystal display comprising a display panel which is virtually divided into a plurality of blocks, a backlight unit including a plurality of light sources irradiating light onto the display panel, a backlight dimming controller configured to analyze digital video data, calculate a dimming value of each of the blocks, and adjust a global dimming value based on the dimming values of the blocks so as to increase brightness of the plurality of light sources within previously determined power consumption, and a light source driver configured to output light source driving signals for driving the plurality of light sources based on the dimming values of the blocks and the global dimming value.

In another aspect, there is a method for driving a liquid crystal display including a display panel, which is virtually divided into a plurality of blocks, and a backlight unit including a plurality of light sources irradiating light onto the display panel, the method comprising analyzing digital video data, calculating a dimming value of each of the blocks, and adjusting a global dimming value based on the dimming values of the blocks so as to increase brightness of the plurality of light sources within previously determined power consumption, and outputting light source driving signals for driving the plurality of light sources based on the dimming values of the blocks and the global dimming value.

Advantageous Effects

Embodiments of the invention analyze digital video data, calculate a dimming value of each of blocks, and adjust a global dimming value based on the dimming values of the blocks so as to increase brightness of a plurality of light sources within previously determined power consumption. As a result, the embodiments of the invention are able to perform local dimming and at the same time increase an entire luminance of a display panel within the previously determined power consumption, thereby improving image quality of the display panel.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 6b illustrates dimming values of blocks calculated using digital video data of an image shown in FIG. 6a;

MODE FOR INVENTION

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention. Names of elements used in the following description will be selected in consideration of facility of specification preparation. Thus, the names of the elements may be different from names of elements used in a real product.

Embodiments of the invention relate to a liquid crystal display and a method for driving the same using a global dimming method and a local dimming method. Examples of a backlight dimming method include the global dimming method and the local dimming method. The global dimming method is a method for controlling an entire luminance of a display panel, and the local dimming method is a method for locally controlling the luminance of the display panel. The local dimming method virtually divides the display panel into a plurality of blocks and analyzes digital video data of the blocks, thereby controlling brightness of light sources providing light to the blocks. Hereinafter, the liquid crystal display and the method for driving the same according to the embodiments of the invention are described in detail.

Figure 1:
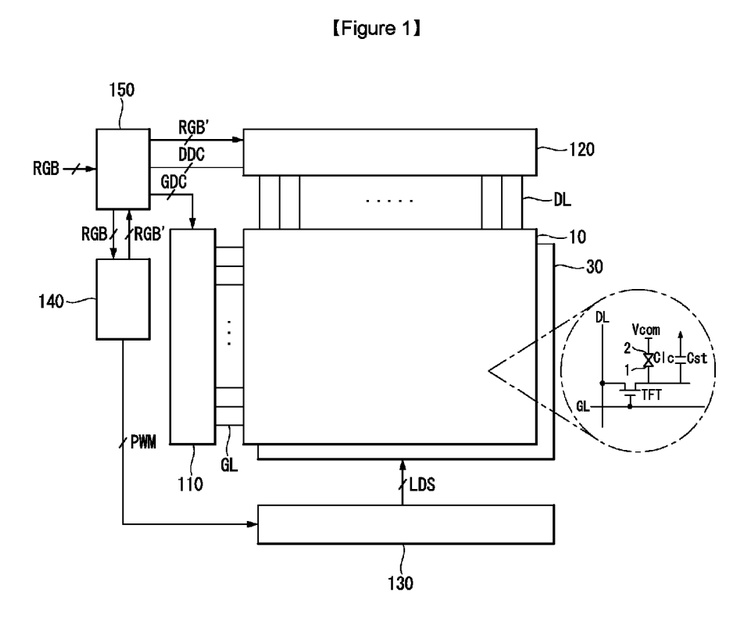
FIG. 1 is a block diagram schematically showing a liquid crystal display according to an exemplary embodiment of the invention.

FIG. 1 is a block diagram schematically showing a liquid crystal display according to an exemplary embodiment of the invention. As shown in FIG. 1, the liquid crystal display according to the embodiment of the invention includes a display panel 10, a backlight unit 30, a gate driver 110, a data driver 120, a light source driver 130, a backlight dimming controller 140, a controller 150, and so on.

The display panel 10 includes an upper glass substrate, a lower glass substrate, and a liquid crystal layer between the upper and lower glass substrates. A plurality of data lines DL and a plurality of gate lines GL cross each other on the lower glass substrate of the display panel 10. A plurality of liquid crystal cells Clc are arranged on the display panel 10 in a matrix form based on a crossing structure of the data lines DL and the gate lines GL. Each of the liquid crystal cells Clc includes a thin film transistor (TFT), a pixel electrode 1 connected to the TFT, a storage capacitor Cst, and so on. Black matrixes, color filters, etc. are formed on the upper glass substrate of the display panel 10. In a vertical electric field driving manner such as a twisted nematic (TN) mode and a vertical alignment (VA) mode, common electrodes 2 may be formed on the upper glass substrate. In a horizontal electric field driving manner such as an in-plane switching (IPS) mode and a fringe field switching (FFS) mode, the common electrodes 2 may be formed on the lower glass substrate along with the pixel electrodes 1.

Each liquid crystal cell Clc is driven by an electric field between the pixel electrode 1 and the common electrode 2. The liquid crystal cell Clc may be implemented as one of a red liquid crystal cell, a green liquid crystal cell, and a blue liquid crystal cell, but is not limited thereto. For example, each liquid crystal cell Clc may be implemented as a yellow liquid crystal cell, a magenta liquid crystal cell, a cyan liquid crystal cell, or a white liquid crystal cell. If the liquid crystal cell Clc is implemented as the red liquid crystal cell, a pixel may function as red subpixels. If the liquid crystal cell Clc is implemented as the green liquid crystal cell, a pixel may function as green subpixels. If the liquid crystal cell Clc is implemented as the blue liquid crystal cell, a pixel may function as blue subpixels. The embodiment of the invention described that one pixel includes a red subpixel, a green subpixel, and a blue subpixel, as an example. Polarizing plates are respectively attached to the upper and lower glass substrates of the display panel 10. Alignment layers for setting a pre-tilt angle of liquid crystals are respectively formed on the inner surfaces contacting the liquid crystals in the upper and lower glass substrates.

Figure 2:
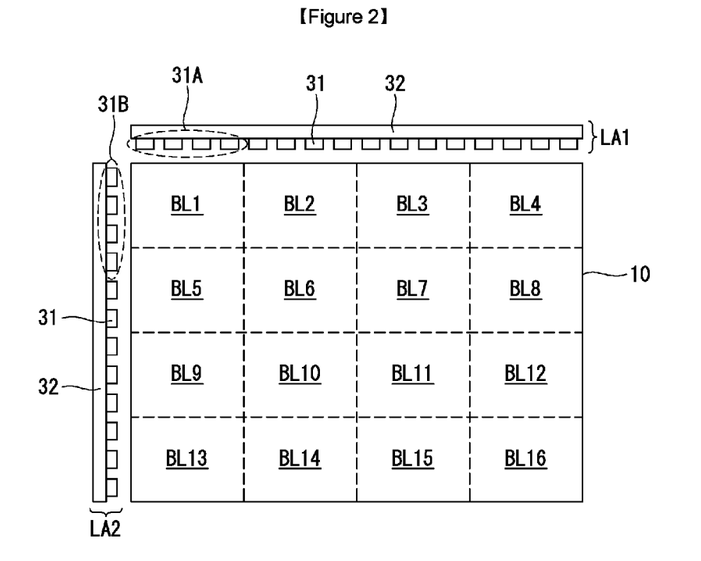
FIG. 2 illustrates an example of a disposition relationship between light sources of an edge type backlight unit and a display panel.
Figure 3:
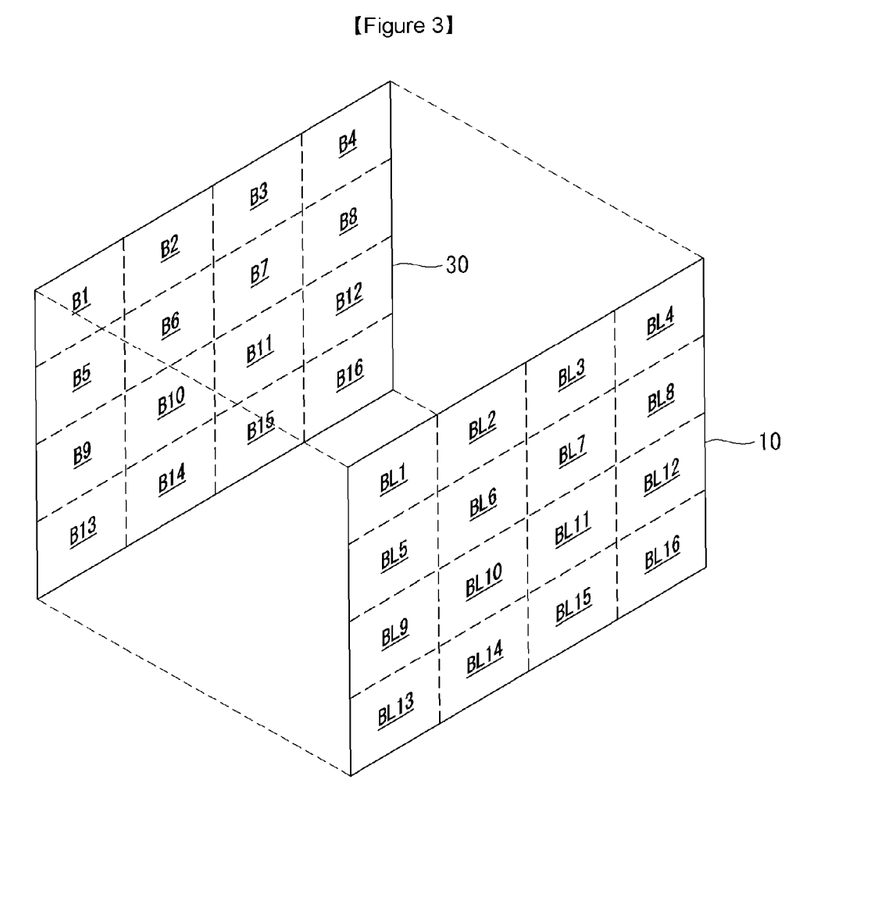
FIG. 3 illustrates an example of a disposition relationship between light sources of a direct type backlight unit and a display panel.

As shown in FIGS. 2 and 3, the display panel 10 may be virtually divided into a plurality of blocks. FIGS. 2 and 3 show that the display panel 10 is equally divided into 16 blocks BL1 to BL16 as an example. However, the embodiment of the invention is not limited thereto. Each block may include a plurality of pixels.

The gate driver 110 includes a plurality of gate driver integrated circuits (ICs). Each gate driver IC includes a shift register sequentially generating an output signal, a level shifter for converting the output signal of the shift register into a signal having a swing width suitable for a TFT drive of the liquid crystal cell, an output buffer, and so on. The gate driver 110 sequentially outputs a gate pulse (or a scan pulse) under the control of the controller 150 and supplies the gate pulse to the gate lines GL. Hence, a horizontal line, to which data voltages will be applied, is selected.

The data driver 120 includes a plurality of data driver ICs. Each data driver IC receives compensated digital video data RGB' from the controller 150. The data driver IC converts the compensated digital video data RGB' into positive and negative analog data voltages using positive and negative gamma compensation voltages supplied from a gamma voltage generating circuit (not shown). The data driver IC supplies the positive and negative analog data voltages to the data lines DL of the display panel 10.

The backlight unit 30 includes a plurality of light sources irradiating light onto the display panel 10. The backlight unit 30 may be one of an edge type backlight unit and a direct type backlight unit.

The edge type backlight unit 30 has a structure, in which a plurality of optical sheets and a light guide plate are stacked under the display panel 10, and a plurality of light sources are disposed on a side surface of the light guide plate. In the edge type backlight unit 30, the light sources are disposed on at least one of upper and lower sides of the display panel 10 and at least one of left and right sides of the display panel 10. FIG. 2 shows that a first light source array LA1 is disposed on the upper side of the display panel 10, and a second light source array LA2 is disposed on the left side of the display panel 10, as an example. Each of the first and second light source arrays LA1 and LA2 includes a plurality of light sources 31 and a light source circuit board 32, on which the light sources 31 are mounted. In this instance, brightness of light incident on the first block BL1 of the display panel 10 may be adjusted using light sources 31A of the first light source array LA1 and light sources 31B of the second light source array LA2 disposed at a position corresponding to the first block BL1 of the display panel 10.

The direct type backlight unit 30 has a structure, in which a plurality of optical sheets and a diffuser plate are stacked under the display panel 10, and a plurality of light sources are disposed under the diffuser plate. As shown in FIG. 3, the direct type backlight unit 30 is divided into a plurality of blocks B1 to B16 respectively corresponding to the blocks BL1 to BL16 of the display panel 10. In this instance, brightness of light incident on the first block BL1 of the display panel 10 may be adjusted using light sources 31 belonging to the first block B1 of the backlight unit 30 disposed at a position corresponding to the first block BL1 of the display panel 10.

The light sources 31 may be implemented as point light sources such as a light emitting diode (LED). The light sources 31 receive light source driving signals LDS from the light source driver 130 and are turned on or off. An intensity of light emitted from the light sources 31 may be adjusted depending on amplitudes of the light source driving signals LDS, and a turn-on period of the light sources 31 may be adjusted depending on pulse widths of the light source driving signals LDS. The brightness of light output from the light sources 31 may be adjusted depending on the light source driving signals LDS.

The light source driver 130 produces the light source driving signals LDS based on dimming values BDIM of the blocks received from the backlight dimming controller 140 and a global dimming value GDIM and outputs the light source driving signals LDS to the light sources 31 of the backlight unit 30. The dimming values BDIM of the blocks are values for performing the local dimming, and the global dimming value GDIM is a value for performing the global dimming. The liquid crystal display according to the embodiment of the invention controls the light sources 31 of the backlight unit 30 using the light source driving signals LDS, thereby adjusting the brightness of light supplied to each of the blocks of the display panel 10.

The backlight dimming controller 140 analyzes input digital video data RGB, calculates the dimming value BDIM of each block, and adjusts the global dimming value GDIM based on the dimming values BDIM of the blocks so as to increase the brightness of the plurality of light sources 31 within previously determined power consumption. The backlight dimming controller 140 outputs the dimming values BDIM of the blocks and the global dimming value GDIM to the light source driver 130 in a serial peripheral interface (SPI) data format. The backlight dimming controller 140 compensates for the digital video data RGB based on the dimming values BDIM of the blocks and then outputs the compensated digital video data RGB' to the controller 150. The backlight dimming controller 140 may be included in the controller 150.

The embodiment of the invention adjusts the global dimming value GDIM using the backlight dimming controller 140 so as to increase the brightness of the light sources 31 within the previously determined power consumption. As a result, the embodiment of the invention is able to perform the local dimming and at the same time increase the luminance of the display panel 10 within the previously determined power consumption, thereby improving the image quality of the display panel. The backlight dimming controller 140 will be described in detail later with reference to FIGS. 4 and 5.

The controller 150 receives the digital video data RGB and timing signals from a host system (not shown). The timing signals may include a vertical sync signal, a horizontal sync signal, a data enable signal, a clock, etc.

The controller 150 may include a timing controller which produces a gate control signal GDC based on the timing signals to control the gate driver 110 using the gate control signal GDC and produces a data control signal DDC based on the timing signals to control the data driver 120 using the data control signal DDC. The gate control signal GDC may include a gate start pulse, a gate shift clock, a gate output enable signal, etc. The data control signal DDC may include a source start pulse, a source shift clock, a source output enable signal, a polarity control signal, etc. The timing controller may output the gate control signal GDC to the gate driver 110 and output the digital video data RGB and the data control signal DDC to the data driver 120. Further, the timing controller may output the digital video data RGB to the backlight dimming controller 140 and receive the compensated digital video data RGB' from the backlight dimming controller 140.

Figure 4:
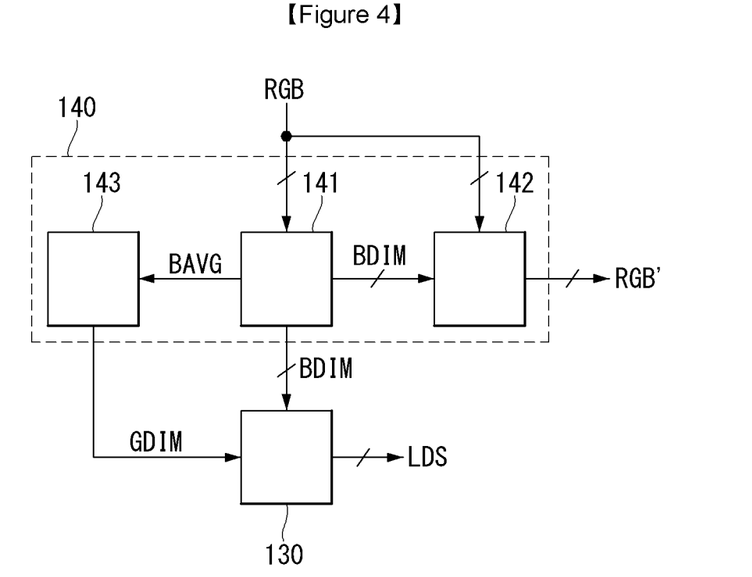
FIG. 4 is a block diagram showing in detail a backlight dimming controller and a light source driver shown in FIG. 1.
Figure 5:
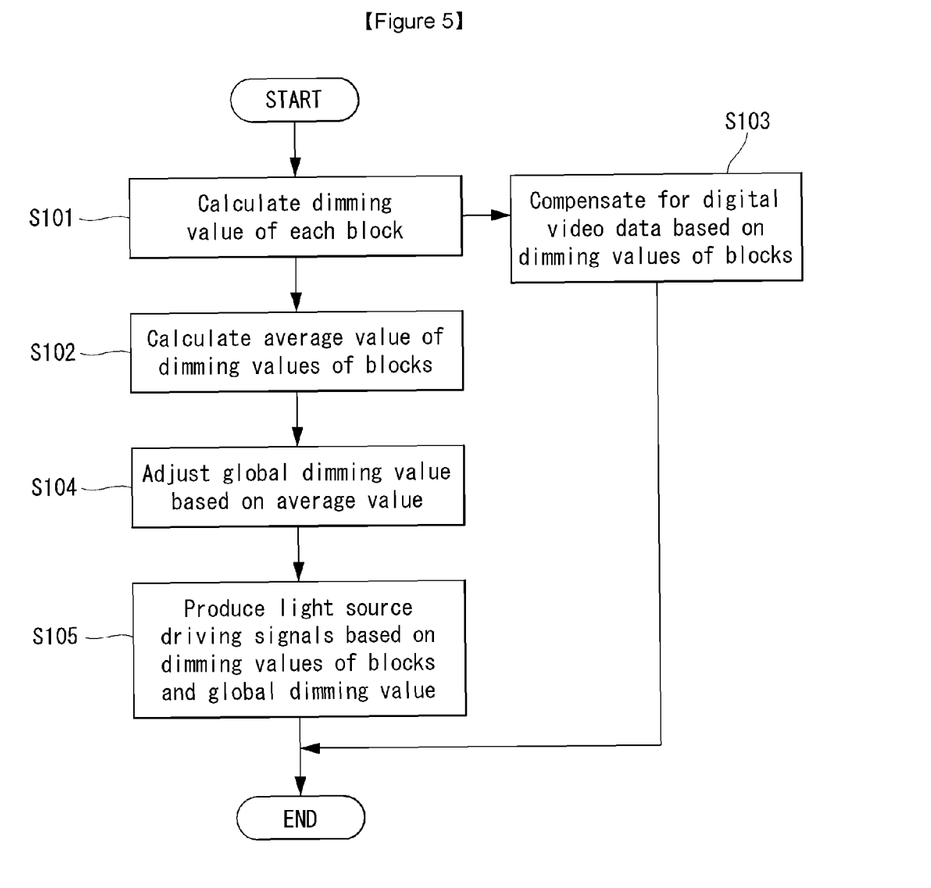
FIG. 5 is a flow chart illustrating a backlight dimming control method according to a first embodiment of the invention.

FIG. 4 is a block diagram showing in detail the backlight dimming controller and the light source driver shown in FIG. 1. FIG. 5 is a flow chart illustrating a backlight dimming control method according to a first embodiment of the invention. As shown in FIG. 4, the backlight dimming controller 140 includes a dimming value calculating unit 141 for each block, a digital video data compensation unit 142, and a global dimming value adjusting unit 143. Hereinafter, a backlight dimming control method according to the first embodiment of the invention is described in detail with reference to FIGS. 4 and 5.

Firstly, the dimming value calculating unit 141 for each block receives the digital video data RGB from the controller 150. The dimming value calculating unit 141 for each block analyzes the digital video data RGB on a per block of the display panel 10 basis and calculates a representative value of each block. For example, the dimming value calculating unit 141 for each block may calculate a sum of digital video data RGB of one block, an average value of the digital video data RGB of the one block, or a maximum value of the digital video data RGB of the one block as a representative value of the one block. Alternatively, the dimming value calculating unit 141 for each block may calculate a sum of luminances of one block, an average value of the luminances of the one block, or a maximum value of the luminances of the one block as a representative value of the one block. A luminance value 'Y' may be calculated from the digital video data RGB as indicated by the following Equation 1.

$$Y = 16 + \frac{1}{256}(65.783R + 129.057G + 25.064B) \quad \text{[Equation 1]}$$

The dimming value calculating unit 141 for each block calculates dimming values BDIM of the blocks based on the representative values of the blocks. The dimming value calculating unit 141 for each block calculates a dimming value of one block in proportion to a representative value of the one block. Thus, as the representative value of the one block increases, the dimming value of the one block increases.

Figure 6A:
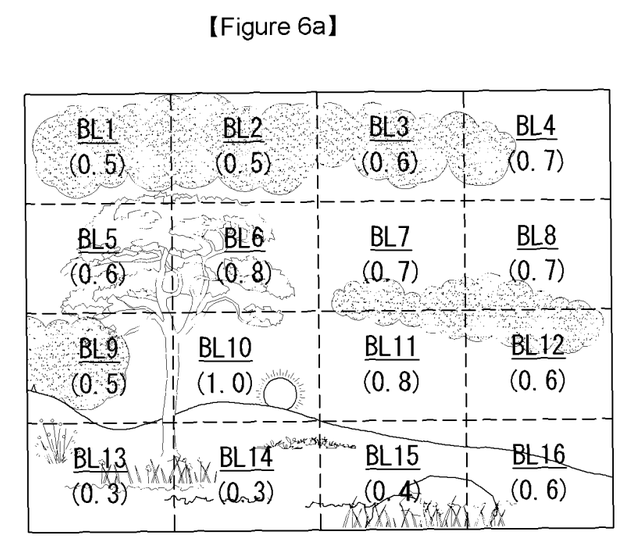
FIG. 6a shows any one image.
Figure 6B:
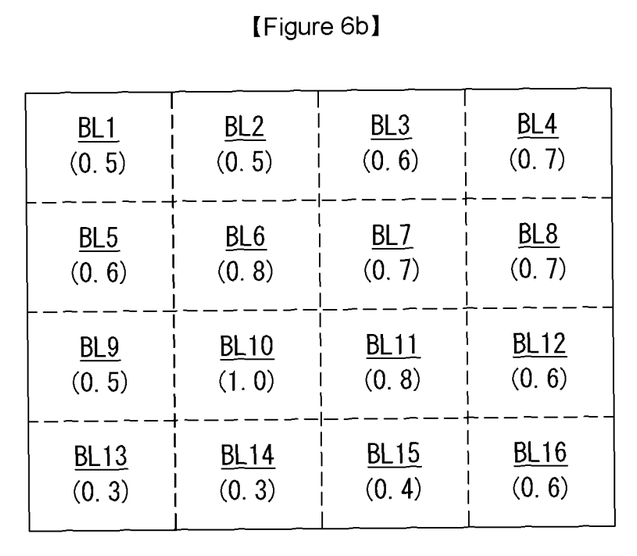

FIG. 6a shows any one image. FIG. 6b illustrates dimming values of blocks calculated using digital video data of the image shown in FIG. 6a. In the image shown in FIG. 6a, an area, in which the sun is displayed, is the brightest. Therefore, as shown in FIG. 6b, a dimming value of the tenth block BL10 corresponding to the sun area is obtained as a maximum value. FIG. 6b shows the dimming values BDIM of the blocks each have a value between 0 and 1.

The dimming value calculating unit 141 for each block outputs the dimming values BDIM of the blocks to the digital video data compensation unit 142 and the light source driver 130 in step S101.

Secondly, the dimming value calculating unit 141 for each block calculates an average value BAVG of the dimming values BDIM of the blocks. For example, as shown in FIG. 6b, an average value BAVG of the dimming values of the first to sixteenth blocks BL1 to BL16 is calculated as 0.6. The dimming value calculating unit 141 for each block outputs the average value BAVG of the dimming values BDIM of the blocks to the global dimming value adjusting unit 143 in step S102.

Thirdly, the digital video data compensation unit 142 receives the dimming values BDIM of the blocks from the dimming value calculating unit 141 for each block and receives the digital video data RGB from the controller 150. The digital video data compensation unit 142 compensates for the digital video data RGB based on the dimming values BDIM of the blocks. More specifically, the digital video data compensation unit 142 may compensate for the digital video data RGB of one block by a reduction amount of a dimming value of the one block.

For example, as shown in FIG. 6b, when the dimming value of the first block BL1 is 0.5, the dimming value of the first block BL1 is reduced by 0.5 based on a reference dimming value '1'. In this instance, the light sources of the backlight unit 30 provide the first block BL1 of the display panel 10 with light corresponding to about one half of brightness of light provided when the local dimming is not performed on the first block BL1. Hence, because a luminance of the first block BL1 of the display panel 10 is greatly reduced, the digital video data compensation unit 142 increases the digital video data RGB of the first block BL1. In this instance, when a dimming value of one block is reduced at a predetermined rate, an increase rate in digital video data RGB of the one block may be previously determined through a preliminary experiment.

The digital video data compensation unit 142 outputs the compensated digital video data RGB' to the controller 150 in step S103.

Fourthly, the global dimming value adjusting unit 143 receives the average value BAVG of the dimming values BDIM of the blocks from the dimming value calculating unit 141 for each block. Further, the global dimming value adjusting unit 143 receives the global dimming value GDIM from the controller 150 or the host system (not shown). The controller 150 or the host system may adjust and output the global dimming value GDIM through the automatic luminance adjustment based on a luminance or an illuminance a user adjusts. The dimming value BDIM of the block is to adjust the luminance of each block of the display panel 10. Namely, the dimming value BDIM of the block is to locally adjust the luminance of the display panel 10 on a per block of the display panel 10 basis. On the other hand, the global dimming value GDIM is to adjust the entire luminance of the display panel 10.

The global dimming value adjusting unit 143 adjusts the global dimming value GDIM based on the average value BAVG of the dimming values BDIM of the blocks. More specifically, the global dimming value adjusting unit 143 calculates a dimming gain value DGV, which increases the brightness of the light sources 31 within the previously determined power consumption, based on the average value BAVG of the dimming values BDIM of the blocks. The global dimming value adjusting unit 143 may calculate the dimming gain value DGV as indicated by the following Equation 2.

$$DGV = \frac{1}{BAVG} \quad \text{[Equation 2]}$$

As indicated by the above Equation 2, the dimming gain value DGV may be inversely proportional to the average value BAVG of the dimming values BDIM of the blocks. For example, as shown in FIG. 6b, when the average value BAVG of the dimming values BDIM of the blocks is 0.6, the dimming gain value DGV may be calculated as 1.6.

The global dimming value adjusting unit 143 adjusts the global dimming value GDIM based on the dimming gain value DGV. In this instance, as the dimming gain value DGV increases, the global dimming value GDIM may increase. For example, the global dimming value GDIM may be adjusted by multiplying the global dimming value GDIM by the dimming gain value DGV.

As the dimming values BDIM of the blocks decrease, the brightness of light provided to the blocks decreases. Therefore, the power consumption is reduced. An average reduction amount of the brightness of light provided to the blocks (i.e., a reduction amount of the power consumption within the previously determined power consumption) may be approximately found using the average value BAVG of the dimming values BDIM of the blocks. For example, it is assumed that the dimming values of all of the blocks are '1' when the backlight dimming is not performed, and the average value BAVG of the dimming values BDIM of the blocks is '0.6' as shown in FIG. 6b when the backlight dimming is performed. Namely, the power consumption when the backlight dimming is performed may be about 0.6 times less than the power consumption when the backlight dimming is not performed. In this instance, even if the average value BAVG of the dimming values BDIM of the blocks increases to 1/0.66≈1.67, the power consumption when the backlight dimming is performed may be substantially equal to the power consumption when the backlight dimming is not performed. Thus, the embodiment of the invention may calculate the dimming gain value DGV for increasing the brightness of the light sources 31 within the previously determined power consumption and then adjust the global dimming value GDIM based on the dimming gain value DGV, thereby entirely increasing the luminance of the display panel 10.

The global dimming value adjusting unit 143 outputs the adjusted global dimming value GDIM to the light source driver 130 in step S104.

Fifthly, the light source driver 130 receives the dimming values BDIM of the blocks from the dimming value calculating unit 141 for each block and receives the global dimming value GDIM from the global dimming value adjusting unit 143. The light source driver 130 produces and outputs the light source driving signals LDS for driving the light sources 31 based on the dimming values BDIM of the blocks and the global dimming value GDIM.

The light source driver 130 may calculate final dimming values of the blocks using the dimming values BDIM of the blocks and the global dimming value GDIM. For example, the light source driver 130 may calculate the final dimming value of each block by multiplying the dimming value BDIM of each block by the global dimming value GDIM.

Figure 6C:
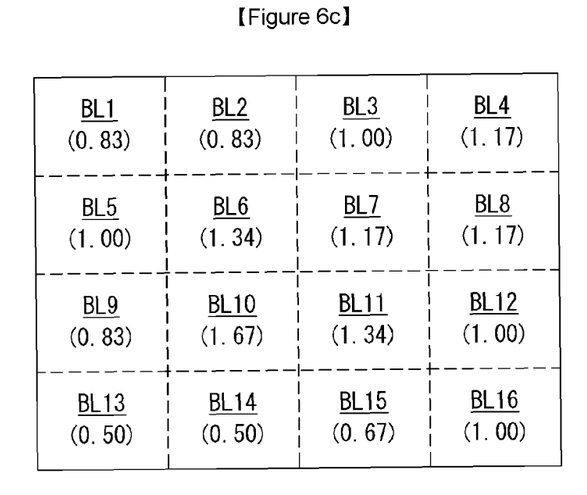
FIG. 6c illustrates final dimming values of the blocks calculated using the dimming values of the blocks shown in FIG. 6b and a global dimming value.

FIG. 6c illustrates the final dimming values of the blocks calculated using the dimming values of the blocks and the global dimming value shown in FIG. 6b. For example, as shown in FIG. 6c, when the global dimming value GDIM is '1.6', the final dimming values of the blocks may be calculated by multiplying the dimming values BDIM of the blocks by the global dimming value GDIM 1.6.

The light source driver 130 outputs the light source driving signals LDS for driving the light sources 31 based on the final dimming values of the blocks. For example, the light source driver 130 increases the brightness of the light sources 31 providing light to one block as the final dimming value of the one block increases.

The light source driver 130 may control an amplitude and/or a pulse width of the light source driving signal LDS, so as to adjust the brightness of the light sources 31. An intensity of the driving current supplied to the light sources 31 may be adjusted by controlling the amplitude of the light source driving signal LDS. Further, a duty ratio of the light sources 31 may be adjusted by controlling the pulse width of the light source driving signal LDS. The duty ratio of the light source 31 may be defined by the following Equation 3.

$$DR = \frac{T_{ON}}{T_{ON} + T_{OFF}} \qquad [\text{Equation 3}]$$

In the above Equation 3, 'DR' indicates the duty ratio of the light source 31, 'TON' indicates the turn-on period of the light source 31, and 'TOFF' indicates the turn-off period of the light source 31.

FIGS. 7a to 7g illustrate a light source driving signal. For example, the light source driver 130 may increase the intensity of the driving current supplied to the light sources 31 by increasing an amplitude 'A' of the light source driving signal LDS shown in FIG. 7b more than an amplitude 'A' of the light source driving signal LDS shown in FIG. 7a. Hence, the light source driver 130 may increase the intensity of light emitted from the light sources 31. Further, the light source driver 130 may increase a length of a supply period of the driving current of the light sources 31 by increasing a pulse width 'W' of the light source driving signal LDS shown in FIG. 7c more than a pulse width 'W' of the light source driving signal LDS shown in FIG. 7a. Hence, the light source driver 130 may increase the duty ratio of the light sources 31. Further, the light source driver 130 may increase both the intensity of the driving current supplied to the light sources 31 and the length of the supply period of the driving current by simultaneously increasing the amplitude 'A' and the pulse width 'W' of the light source driving signal LDS shown in FIG. 7d more than the amplitude 'A' and the pulse width 'W' of the light source driving signal LDS shown in FIG. 7a. Hence, the light source driver 130 may increase the intensity of light emitted from the light sources 31 and the duty ratio of the light sources 31.

Figure 7A:
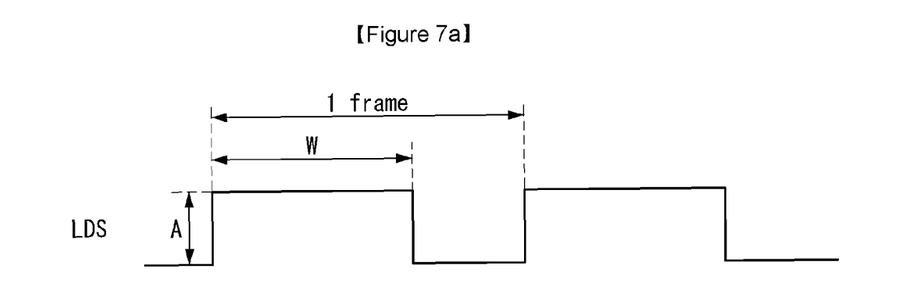
FIGS. 7a to 7g illustrate a light source driving signal.
Figure 7B:
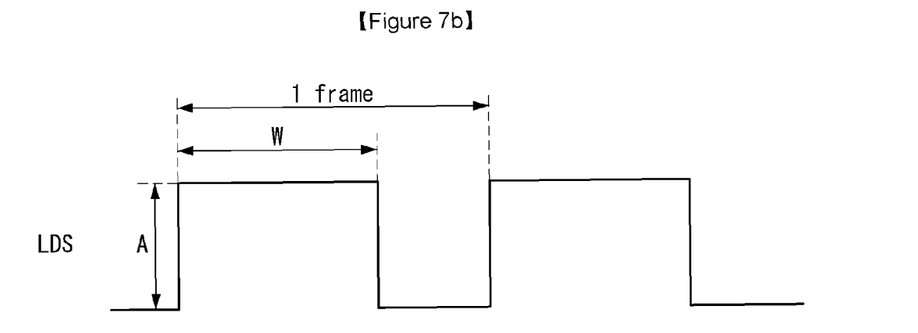
Figure 7C:
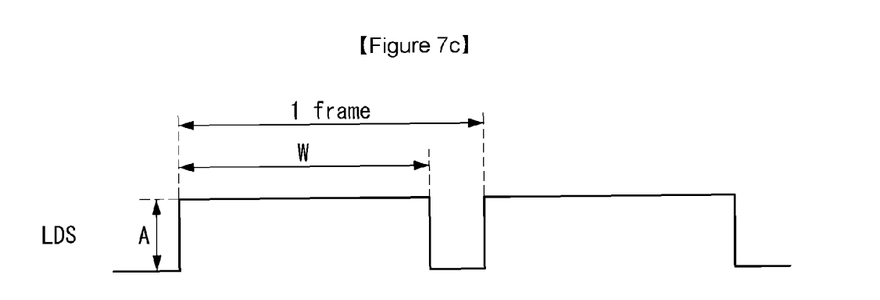
Figure 7D:
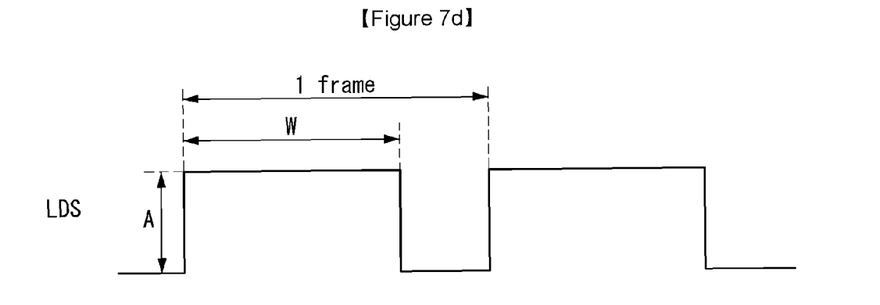
Figure 7E:
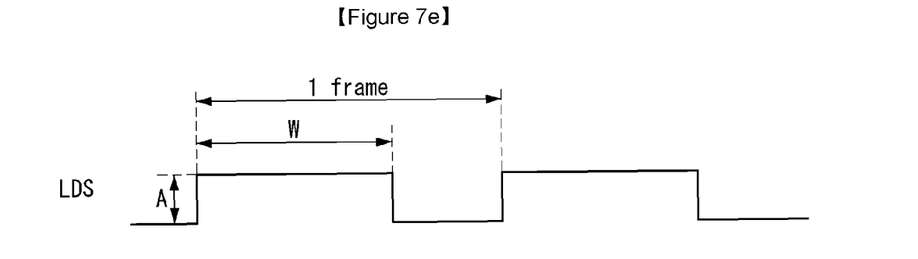
Figure 7F:
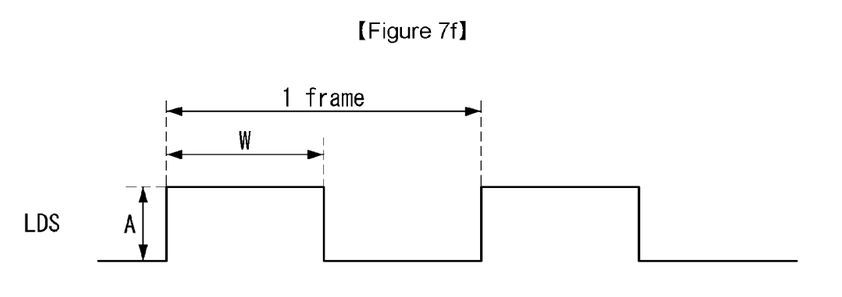
Figure 7G:
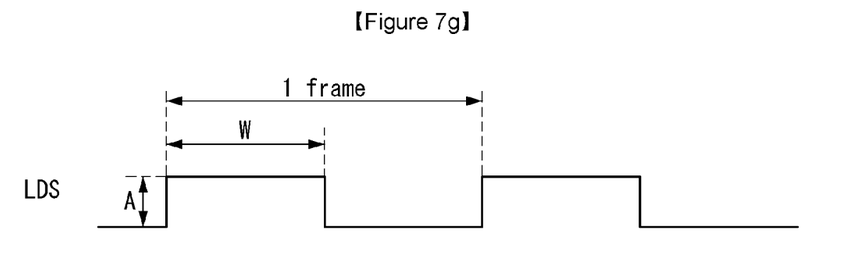

The light source driver 130 may reduce the intensity of the driving current supplied to the light sources 31 by reducing the amplitude 'A' of the light source driving signal LDS shown in FIG. 7e less than the amplitude 'A' of the light source driving signal LDS shown in FIG. 7a. Hence, the light source driver 130 may reduce the intensity of light emitted from the light sources 31. Further, the light source driver 130 may reduce the length of the supply period of the driving current of the light sources 31 by reducing the pulse width 'W' of the light source driving signal LDS shown in FIG. 7f less than the pulse width 'W' of the light source driving signal LDS shown in FIG. 7a. Hence, the light source driver 130 may reduce the duty ratio of the light sources 31. Further, the light source driver 130 may reduce both the intensity of the driving current supplied to the light sources 31 and the length of the supply period of the driving current by simultaneously reducing the amplitude 'A' and the pulse width 'W' of the light source driving signal LDS shown in FIG. 7g less than the amplitude 'A' and the pulse width 'W' of the light source driving signal LDS shown in FIG. 7a. Hence, the light source driver 130 may reduce the intensity of light emitted from the light sources 31 and the duty ratio of the light sources 31.

The light source driver 130 produces the light source driving signals LDS based on any block the light sources 31 control, and then outputs the light source driving signals LDS to the light sources 31 of the backlight unit 30 in step S105.

As described above, the first embodiment of the invention analyzes the digital video data, calculates the dimming value of each block, and adjusts the global dimming value based on the dimming values of the blocks so as to increase the brightness of the light sources within the previously determined power consumption. As a result, the first embodiment of the invention is able to perform the local dimming and at the same time increase the entire luminance of the display panel within the previously determined power consumption, thereby improving the image quality of the display panel.

Figure 8:
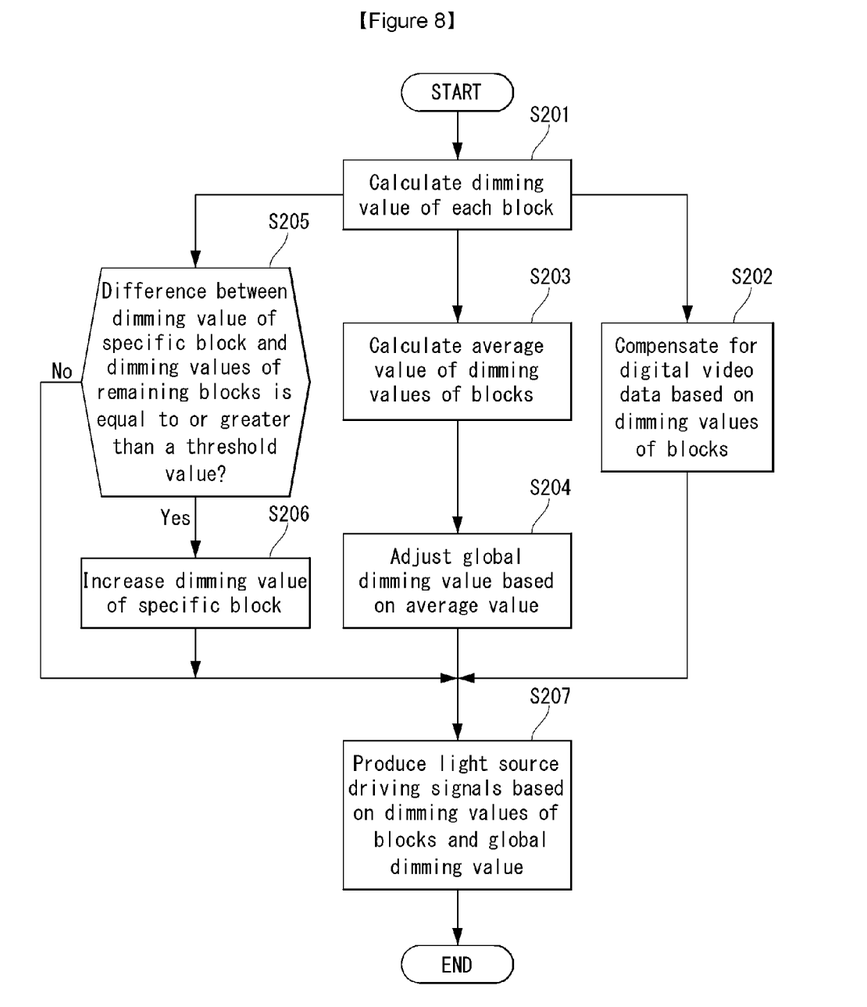
FIG. 8 is a flow chart illustrating a backlight dimming control method according to a second embodiment of the invention.

FIG. 8 is a flow chart illustrating a backlight dimming control method according to a second embodiment of the invention. The backlight dimming control method according to the second embodiment of the invention is described in detail below with reference to FIGS. 4 and 8.

Firstly, the dimming value calculating unit 141 for each block receives the digital video data RGB from the controller 150. The dimming value calculating unit 141 for each block analyzes the digital video data RGB on a per block of the display panel 10 basis and calculates a representative value of each block. The dimming value calculating unit 141 for each block calculates dimming values BDIM of the blocks based on the representative values of the blocks. A method for calculating the dimming values BDIM of the blocks through the dimming value calculating unit 141 for each block is substantially the same as the method described in the step S101 shown in FIG. 5.

The dimming value calculating unit 141 for each block outputs the dimming values BDIM of the blocks to the digital video data compensation unit 142 in step S201.

Secondly, the dimming value calculating unit 141 for each block calculates an average value BAVG of the dimming values BDIM of the blocks. A method for calculating the average value BAVG of the dimming values BDIM of the blocks through the dimming value calculating unit 141 for each block is substantially the same as the method described in the step S102 shown in FIG. 5. The dimming value calculating unit 141 for each block outputs the average value BAVG of the dimming values BDIM of the blocks to the global dimming value adjusting unit 143 in step S202.

Thirdly, the digital video data compensation unit 142 receives the dimming values BDIM of the blocks from the dimming value calculating unit 141 for each block and receives the digital video data RGB from the controller 150. The digital video data compensation unit 142 compensates for the digital video data RGB based on the dimming values BDIM of the blocks. A method for compensating for the digital video data RGB through the digital video data compensation unit 142 is substantially the same as the method described in the step S103 shown in FIG. 5.

The digital video data compensation unit 142 outputs the compensated digital video data RGB' to the controller 150 in step S203.

Fourthly, the global dimming value adjusting unit 143 receives the average value BAVG of the dimming values BDIM of the blocks from the dimming value calculating unit 141 for each block. Further, the global dimming value adjusting unit 143 receives the global dimming value GDIM from the controller 150 or the host system (not shown). The global dimming value adjusting unit 143 adjusts the global dimming value GDIM based on the average value BAVG of the dimming values BDIM of the blocks. A method for adjusting the global dimming value GDIM through the global dimming value adjusting unit 143 is substantially the same as the method described in the step S104 shown in FIG. 5.

The global dimming value adjusting unit 143 outputs the adjusted global dimming value GDIM to the light source driver 130 in step S204.

Fifthly, the dimming value calculating unit 141 for each block decides whether or not a difference between a dimming value of a specific block and the dimming value of each of the remaining blocks is equal to or greater than a previously determined threshold value. The fact that the difference is equal to or greater than the threshold value indicates that the specific block is represented more brightly than the remaining blocks. Thus, when the difference is equal to or greater than the threshold value, the dimming value calculating unit 141 for each block increases the dimming value of the specific block. Hence, contrast characteristics of an image displayed on the display panel may further increase.

The dimming value calculating unit 141 for each block outputs the dimming values BDIM of the blocks to the light source driver 130 in steps S205 and S206.

Sixthly, the light source driver 130 receives the dimming values BDIM of the blocks from the dimming value calculating unit 141 for each block and receives the global dimming value GDIM from the global dimming value adjusting unit 143. The light source driver 130 produces and outputs the light source driving signals LDS for driving the light sources 31 based on the dimming values BDIM of the blocks and the global dimming value GDIM. A method for producing the light source driving signals LDS through the light source driver 130 is substantially the same as the method described in the step S105 shown in FIG. 5.

The light source driver 130 produces the light source driving signals LDS based on any block the light sources 31 control, and then outputs the light source driving signals LDS to the light sources 31 of the backlight unit 30 in step S207.

As described above, the second embodiment of the invention analyzes the digital video data, calculates the dimming value of each block, and adjusts the global dimming value based on the dimming values of the blocks so as to increase the brightness of the light sources within the previously determined power consumption. As a result, the second embodiment of the invention is able to perform the local dimming and at the same time increase the entire luminance of the display panel within the previously determined power consumption, thereby improving the image quality of the display panel.

Further, the backlight dimming controller 140 increases the dimming value of the specific block when the difference between the dimming value of the specific block and the dimming value of each of the remaining blocks is equal to or greater than the previously determined threshold value. As a result, the second embodiment of the invention may further increase the contrast characteristics of the image displayed on the display panel.

In addition, when the difference between the dimming value of the specific block and the dimming value of each of the remaining blocks is equal to or greater than the threshold value, the second embodiment of the invention may apply the global dimming value GDIM only to the dimming value of the specific block to thereby increase a luminance of the specific block, instead of the method for increasing the dimming value of the specific block. Hence, the contrast characteristics of the displayed image may increase. In this instance, the light source driver 130 may apply the global dimming value to the dimming value of the specific block and calculate a final dimming value of the specific block. Further, the light source driver 130 may apply the global dimming value, which is reduced by a predetermined percentage, to the dimming values of the remaining blocks or may not apply the global dimming value to the dimming values of the remaining blocks, thereby calculating the final dimming values of the remaining blocks.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

INDUSTRIAL APPLICABILITY

The embodiments of the invention may be used in the industries related to the liquid crystal display.

The invention claimed is:

1. A liquid crystal display comprising:
a display panel which is virtually divided into a plurality of blocks;
a backlight unit including a plurality of light sources irradiating light onto the display panel;
a backlight dimming controller including a dimming value calculating unit for each block configured to analyze digital video data on a block per basis, calculate a representative value of each of blocks, calculate a dimming value of each of the blocks based on the representative values of each of the blocks, and calculate an average value of the dimming values of the blocks;
a digital video data compensation unit configured to compensate for the digital video data based on the dimming values of the blocks;
a global dimming value adjusting unit configured to calculate a dimming gain value for increasing brightness of the light sources based on the average value of the dimming values of the blocks within previously determined power consumption and adjust a global dimming value based on the dimming gain value,
wherein the dimming gain value is inversely proportional to the average value of the dimming values of the blocks, and wherein as the dimming gain value increases, the global dimming value increases; and a light source driver configured to output light source driving signals for driving the plurality of light sources based on the dimming values of the blocks and the global dimming value.

2. The liquid crystal display of claim 1, wherein the light source driver produces and outputs the light source driving signals based on final dimming values of the blocks calculated using the dimming values of the blocks and the global dimming value.

3. The liquid crystal display of claim 2, wherein the light source driver differently adjusts an amplitude and a pulse width of the light source driving signal based on the final dimming value of each block.

4. The liquid crystal display of claim 3, wherein the light source driver increases the amplitude and the pulse width of the light source driving signal as the final dimming value of the block increases.

5. The liquid crystal display of claim 2, wherein the light source driver differently adjusts one of an amplitude and a pulse width of the light source driving signal based on the final dimming value of the block.

6. The liquid crystal display of claim 5, wherein the light source driver increases one of the amplitude and the pulse width of the light source driving signal as the final dimming value of the block increases.

7. A method for driving a liquid crystal display including a display panel, which is virtually divided into a plurality of blocks, and a backlight unit including a plurality of light sources irradiating light onto the display panel, the method comprising:

analyzing digital video data on a per block basis, calculating a representative value of each of the blocks, calculating a dimming value of each of the blocks based on the representative values of each of the blocks calculating an average value of the dimming values of the blocks;

compensating for the digital video data based on the dimming values of the blocks;

calculating a dimming gain value for increasing brightness of the light sources based on the average value of the dimming values of the blocks within previously determined power consumption and adjusting a global dimming value based on the dimming gain value, wherein the dimming gain value is inversely proportional to the average value of the dimming values of the blocks, and wherein as the dimming gain value increases, the global dimming value increases; and outputting light source driving signals for driving the plurality of light sources based on the dimming values of the blocks and the global dimming value.

* * * * *